United States Patent
Colpaert

(10) Patent No.: US 7,101,280 B2
(45) Date of Patent: Sep. 5, 2006

(54) GRAIN TANK COVER FOR AN AGRICULTURAL HARVESTER

(75) Inventor: Johny P. C. Colpaert, Zedelgem (BE)

(73) Assignee: New Holland North America, Inc., Racine, WI (US)

( * ) Notice: Subject to any disclaimer, the term of this patent is extended or adjusted under 35 U.S.C. 154(b) by 132 days.

(21) Appl. No.: 10/872,237

(22) Filed: Jun. 18, 2004

(65) Prior Publication Data
US 2004/0254003 A1 Dec. 16, 2004

(30) Foreign Application Priority Data
Jun. 12, 2003 (GB) ................................ 0313541.5

(51) Int. Cl.
A01F 12/60 (2006.01)
(52) U.S. Cl. ........................ 460/119; 460/23
(58) Field of Classification Search ................ 460/119, 460/23, 901, 902, 903; 414/502, 505; 56/28, 56/DIG. 9; 111/24, 63, 74, 75, 200, 925
See application file for complete search history.

(56) References Cited

U.S. PATENT DOCUMENTS

| | | | |
|---|---|---|---|
| 3,485,524 A * | 12/1969 | Nelson | 296/100.1 |
| 4,083,470 A * | 4/1978 | Stefanik et al. | 220/254.2 |
| 4,466,549 A * | 8/1984 | Hanaway | 220/4.03 |
| 5,125,221 A | 6/1992 | Looney | |
| 5,151,064 A * | 9/1992 | Damman et al. | 460/23 |
| 5,427,572 A * | 6/1995 | Deutsch et al. | 460/119 |
| 6,508,705 B1 * | 1/2003 | Van Overschelde | 460/23 |
| 6,692,352 B1 * | 2/2004 | Gerber et al. | 460/119 |
| 2003/0232634 A1 * | 12/2003 | Johnson et al. | 460/119 |
| 2004/0033823 A1 * | 2/2004 | Stephens et al. | 460/119 |

FOREIGN PATENT DOCUMENTS

| | | |
|---|---|---|
| DE | 4120731 | 12/1992 |
| EP | 1201112 | 5/2002 |
| GB | 2296175 A * | 6/1996 |

* cited by examiner

Primary Examiner—Árpád Fábián Kovács
(74) Attorney, Agent, or Firm—Rebecca Henkel

(57) ABSTRACT

A grain tank for an agricultural harvester has an extension assembly to enable the volume of the tank to be increased. The extension assembly comprises two pairs of mutually opposed panels that are movable relative to the tank between a lowered position in which they serve as a cover for an opening in the top of the tank and a raised position in which they define the side walls of an extension volume that communicates through the opening with the interior of the tank. In the invention, a blind is secured to the opposed panels of one of the pairs to cover the grain tank when the extension assembly is raised. The blind is automatically deployed from a stowed position to a extended position as the two panels are moved to their raised position.

6 Claims, 2 Drawing Sheets

GRAIN TANK COVER FOR AN AGRICULTURAL HARVESTER

FIELD OF THE INVENTION

The present invention relates to a grain tank for an agricultural harvester having an extension assembly to enable the volume of the tank to be increased.

BACKGROUND OF THE INVENTION

When a harvester is being driven along a public road, its height needs to be restricted to permit it to pass under bridges and footpaths. While operating in a field on the other hand, it is desirable for the volume of its grain tank to be increased and if this involves increasing the height of the harvester then it would not present a safety hazard. For these reasons it has already been proposed to provide the grain tank of a harvester with an extension assembly that can be collapsed when the vehicle is driven along a public road and extended during field operations.

EP-A-1 201 112 discloses a grain tank having an extension assembly which comprises two pairs of mutually opposed panels that are movable relative to the tank between a lowered position in which they serve as a cover for an opening in the top of the tank and a raised position in which they define the side walls of an extension volume that communicates through the opening with the interior of the tank.

A disadvantage of a grain tank having this type of collapsible extension assembly is that when the panels are raised to increase the volume of the tank, the tank is not covered and as a result water can fall on the harvested crop if it should start to rain.

SUMMARY OF THE INVENTION

With a view to mitigating the foregoing disadvantage, in accordance with the present invention a blind is secured to the opposed panels of one of the pairs to cover the grain tank when the extension assembly is raised, the blind being automatically deployed from a stowed position to an extended position as the two panels are moved to their raised position.

Different forms of collapsible blinds can readily be envisaged by the person skilled in the art and these may be formed of sliding or pivoting shutters. It is however much simpler and less expensive to form the blind of a fabric material.

The fabric could be collapsed in different ways, for example as roman blind (like a ladies' fan), but it is convenient for it to be wound about a roller rotatably mounted on one of the two opposed panels, the free edge of the blind being releasably anchored to the opposite panel of the pair. By spring loading the roller in this case, one can make both the stowing of the blind and its extension take place automatically as the opposed panels of the extension assembly are lowered and raised, respectively.

When rain water falls on a horizontal fabric cover, it tends to sag in the middle and allow a pool of water to collect. This is clearly undesirable, as the water will drop into the grain tank when the extension assembly is lowered.

To avoid this problem, it is preferred to provide mechansims on the other pair of opposed panels for forming a raised ridge in the blind when in the extended position. Such mechansims may suitably comprise two hooks that project beyond the top edges of the other pair of opposed panels and that are operative to engage loops secured to the blind, in order to tension the blind along a line connecting the two loops so as to form the desired raised ridge. The loops may simply be formed of an elasticated material sewn to the fabric of the blind.

BRIEF DESCRIPTION OF THE DRAWINGS

The invention will now be described further, by way of example, with reference to the accompanying drawings, in which.

DETAILED DESCRIPTION OF THE PREFERRED EMBODIMENT

Figure 1:
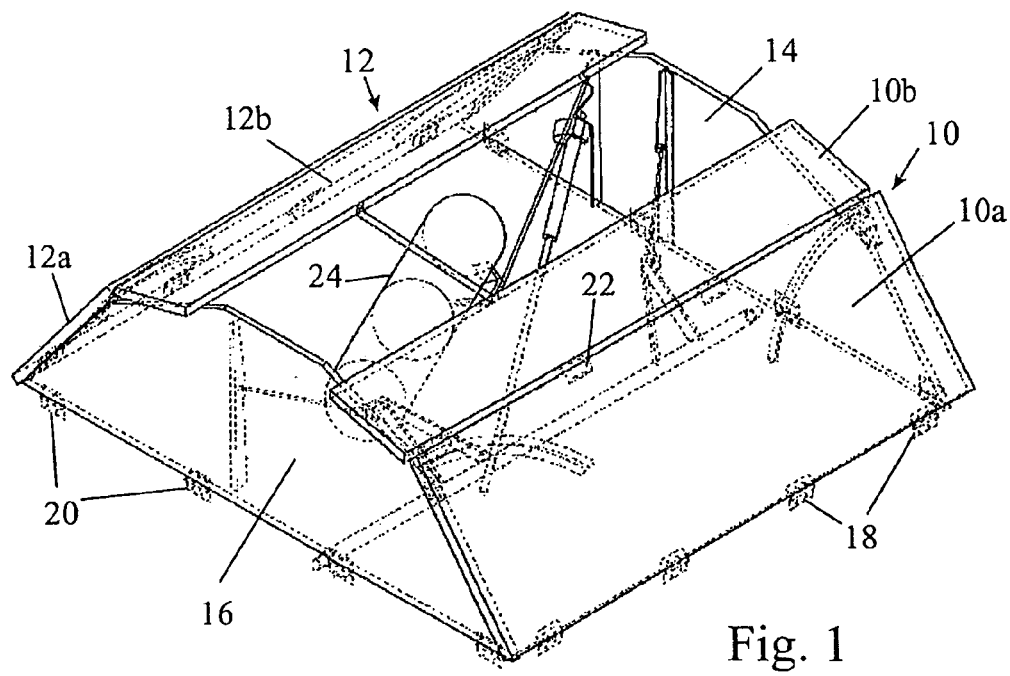
FIG. 1 is a perspective view of a known extension assembly in its raised condition.
Figure 2:
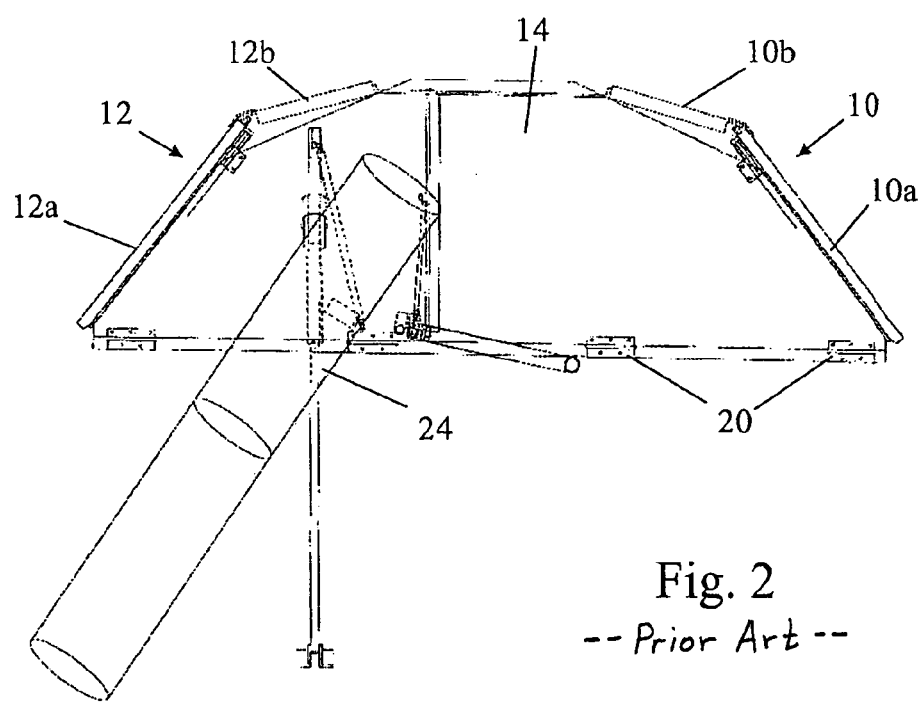
FIG. 2 is a vertical central section through the extension assembly of FIG. 1.

FIGS. 1 and 2 show a grain tank extension assembly comprising four panels 10, 12, 14 and 16. The panels 10 and 12 are hinged by mechansims of hinges 18 to two opposite sides of a rectangular opening in the top of the grain tank of a agricultural harvester (not shown) while the panels 14 and 16 are hinged to the other two sides of the opening by mechansims of hinges 20. The panels 10 and 12 are each formed of two leaves 10*a*, 10*b*, and 12*a*, 12*b* which are connected to one another by mechansims of hinges 22.

In the closed position of the extension assembly, the panels 14 and 16 lie horizontally over the opening in the grain tank but they do not fully cover it because of their shape and because they do not meet in the middle. The panels 10 and 12 close over the panels 14 and 16 and they do meet in the middle as to close the opening fully and protect the contents of the grain tank from rain. In such a closed position of the extension assembly, the tank has its normal volume and the vehicle can the driven on public roads without any risk of it colliding with low bridges or footpaths. The harvester can also be used in this way when harvesting crops, the tank being filled from inside by a so-called bubble-up tube 24. The operator can also inspect the grain tank by manually pivoting open the leaves 10*b* and 12*b*.

In the raised position illustrated in FIGS. 1 and 2, the panels all come together to define an extension volume and an extension to the bubble-up tube 24 ensures that the grain tank continues to fill from the top. This allows grain to be stored both in the grain tank and within the extension volume bounded by the panels 10, 12, 14 and 16 thereby increasing its storage capacity. It will be noted however that the top of the extended grain tank is open and there rain can enter the grain tank.

The design and operation of the grain tank extension has been described above to the extent necessary for an understanding of the present invention, it should however be mentioned that FIGS. 1 and 2 correspond identically to FIGS. 5 and 7, respectively, of EP-A-1 201 112 which describes these figures in much greater detail, including the mechanism for raising and lowering the panels, the manner in which the panels interlock and the raising and lowering of the extension of the bubble-up tube.

Figure 3:
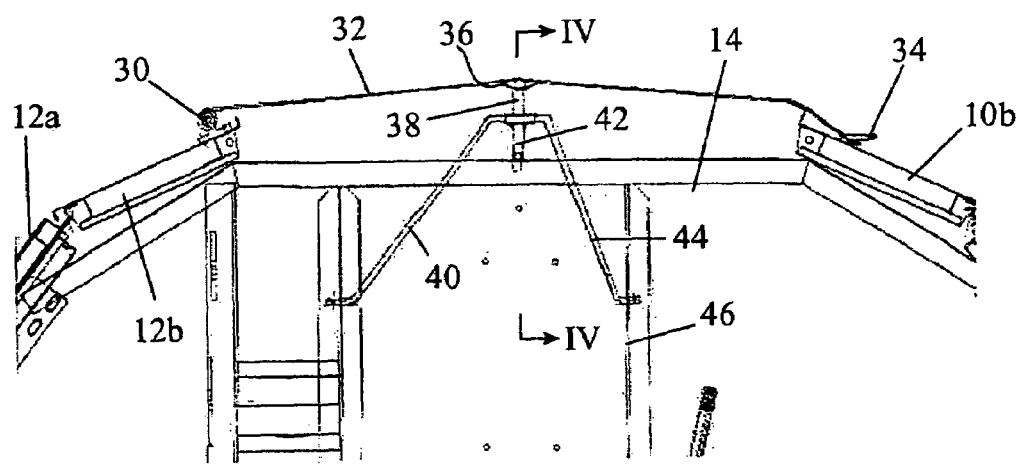
FIG. 3 is a view similar to that of FIG. 2 showing a grain tank of the present invention.

The present invention is concerned only with covering the grain tank when the extension assembly is raised. The preferred embodiment of the invention will be described by reference to FIGS. 3 and 4, it being noted that FIG. 3 corresponds shows the top part of FIG. 2 and that the same reference numerals have been used in both drawings to avoid the need to repeat the description of the extension assembly.

A spring loaded roller 30 about which is wound a fabric blind 32 is rotatably mounted on the leaf 12b of the panel 12. The free edge of the fabric blind is releasably strapped to a cleat 34 on the leaf 10b of the panel 10. In this way, as the panels 10 and 12 are raised and their edges move apart, the roller blind 30, 32 is automatically extended to cover the gap created between the two panels 10 and 12. Conversely, because of the spring loading of the roller 30, slack in the blind 32 is automatic taken up by it being wound about the roller 30 as the edges of the panels 10 and 12 come together to close the gap between them. At any time, the blind 32 can be untied from the panel 10 to allow inspection of the contents of the grain tank.

Figure 4:
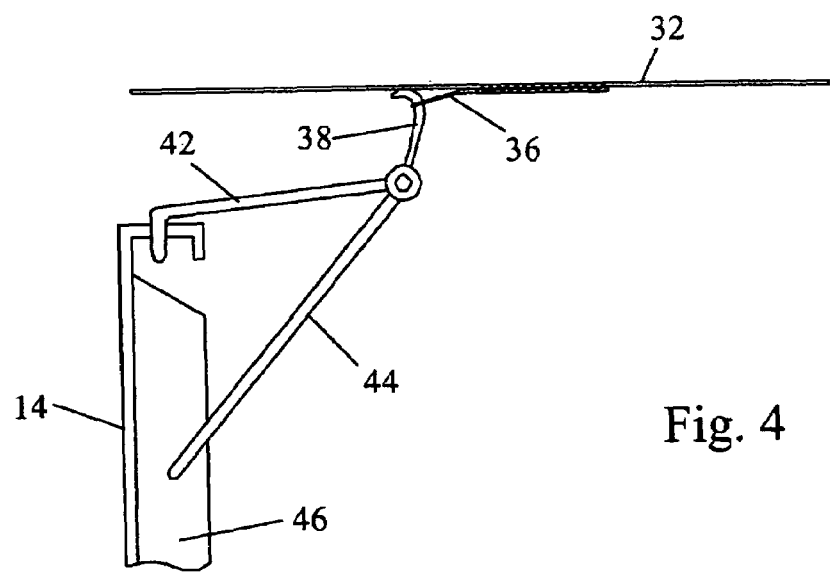
FIG. 4 is a partial section taken in the plane designated IV—IV in FIG. 3.

Referring now to FIG. 4, the other two panels 14 and 16 of the extension assembly are formed with hooks 38 that protrude beyond the top edges of these panels. The hooks 38 are attached by mechansims of three legs 40, 42 and 44 of which two legs 40 and 44 clip into holes in reinforcing brackets 46 secured to the inner surface of the panel 14 or 16 and the third leg 42 engages in a hole in a top flange of the panel 14 or 16. Only one hook 38 and the legs 40,42 and 44 are shown on FIG. 4. A similar construction is made on the other panel 16 or 14.

As the panels 14 and 16 are pivoted into their raised position, the hooks 38 engage in elasticated straps or loops 36 that are sewn to the fabric of the blind 32. The hooks 38 thus tension the line connecting the straps 36 and raise it to form a ridge in the fabric to prevent the blind from sagging and rain water from collecting in a pool in the blind 32. The hooks are automatically disengaged from the straps 36 so that they do not interfere with the collapse of the extension assembly.

It will be appreciated that a roller blind is one of many ways in which it is possible to provide a cover that stows away neatly and extends automatically. For example, one could use a roman blind in placed of roller blind, the fabric of the blind being folded in the manner of a ladies' fan or a concertina. It is also not necessary for the blind to be of a fabric, it could be made of several rigid leaves that are hinged to one another in the form of a concertina. Such an embodiment of the invention may for example comprise a plastics sheet with scored fold lines or film hinges. Elasticated straps can be attached to such a folded plastics sheet or to a fabric roman blind to ensure that it stows away neatly when the panels of the extension assembly are lowered.

The invention claimed is:

1. A grain tank for an agricultural harvester having an extension assembly to enable the volume of the tank to be increased, the extension assembly comprising two pairs of mutually opposed panels that are movable relative to the tank between a lowered position in which they serve as a cover for an opening in the top of the tank and a raised position in which they define the side walls of an extension volume that communicates through the opening with the interior of the tank, characterized in that a blind is secured to one of the two pairs of mutually opposed panels to cover the grain tank when the extension assembly is raised, the blind being automatically deployed from a stowed position to an extended position as the one of the two pairs of mutually opposed panels is moved to the raised position, wherein the blind is wound about a roller rotatably mounted on the one of the two pairs of mutually opposed panels, the free edge of the blind being releasably anchored to the opposite panel of the pair.

2. A grain tank as claimed in claim 1, wherein the blind is formed of a fabric material.

3. A grain tank as claimed in claim 1, wherein the roller is spring loaded.

4. A grain tank as claimed in claim 1, wherein a plurality of mechanisms are provided on the other of the two pairs of mutually opposed panels for forming a raised ridge in the blind when the blind is in the extended position.

5. A grain tank as claimed in claim 1, wherein the plurality of mechansims for forming a raised ridge in the blind comprise two hooks projecting beyond the top edges of the other of the two pairs of mutually opposed panels and operative to engage loops secured to the blind, in order to tension the blind along a line connecting two loops so as to form the raised ridge.

6. A grain tank as claimed in claim 5, wherein the loops are formed of an elasticated material sewn to the fabric of the blind.

* * * * *